United States Patent [19]

Hodson et al.

[11] 4,311,360
[45] Jan. 19, 1982

[54] LASER BEAM POWER MULTIPLICATION

[75] Inventors: Donald R. Hodson; Norbert A. Massie, both of Thousand Oaks, Calif.

[73] Assignee: Rockwell International Corporation, El Segundo, Calif.

[21] Appl. No.: 138,057

[22] Filed: Apr. 7, 1980

[51] Int. Cl.³ ............................................. G02B 27/14
[52] U.S. Cl. ..................................... 350/174; 350/289
[58] Field of Search ............... 350/171, 289, 6.8, 292, 350/174, 299; 331/91.5

[56] References Cited
U.S. PATENT DOCUMENTS 4,154,507  5/1979  Barr ...................................... 350/174

FOREIGN PATENT DOCUMENTS 52-11894  1/1977  Japan ................................. 350/171

Primary Examiner—John K. Corbin
Assistant Examiner—B. Wm. de los Reyes
Attorney, Agent, or Firm—H. F. Hamann; Robert M. Sperry

[57] ABSTRACT

There is described apparatus for combining a plurality of pulsed laser beams into a single beam by a rotating mirror assembly. A rotor supports a plurality of individual mirrors arranged in a plurality of axially spaced planes, one plane for each beam. The mirrors in successive planes are angularly and radially spaced relative to mirrors in the other planes. Incident beams are pulsed successively in synchronism with rotation of the mirrors. Each beam in succession is reflected by a mirror in successive planes along a common axis to form a single reflected beam.

8 Claims, 6 Drawing Figures

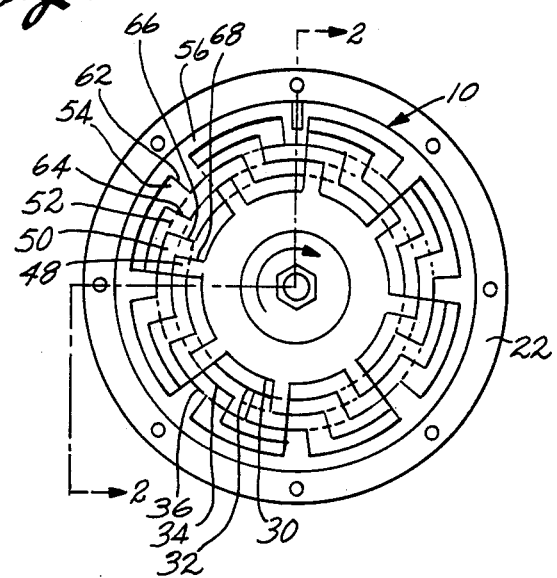
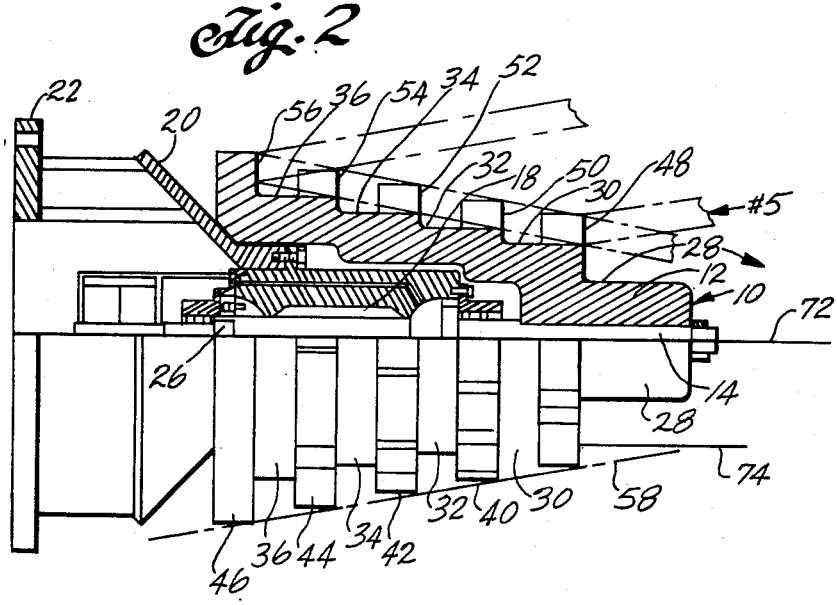

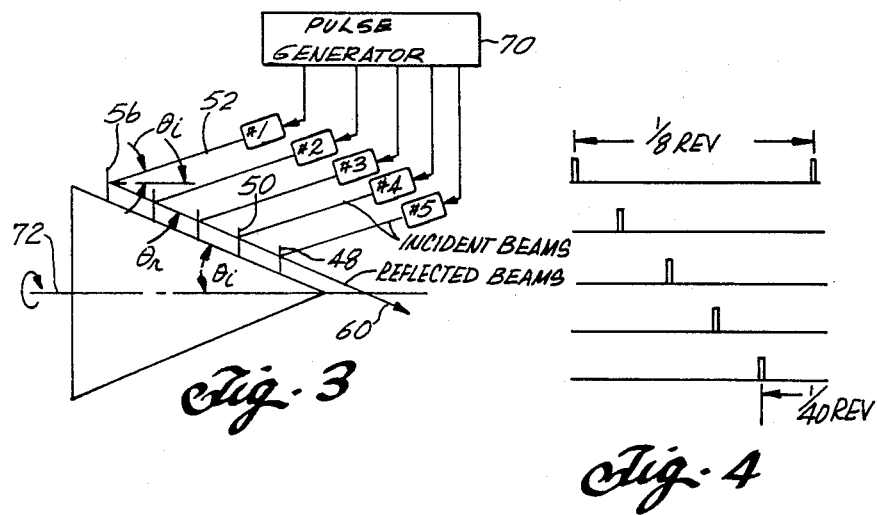
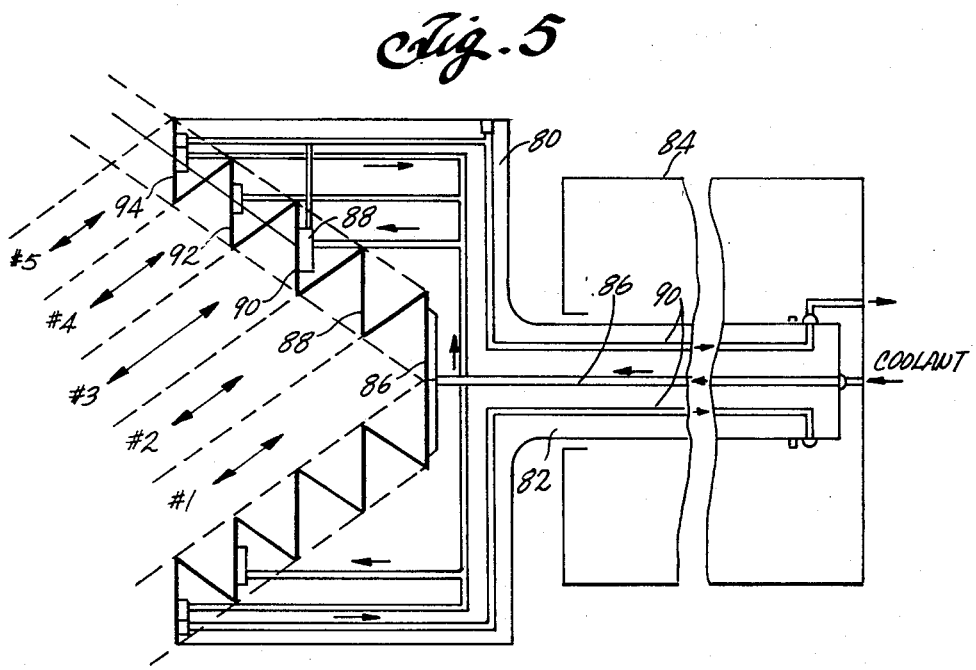

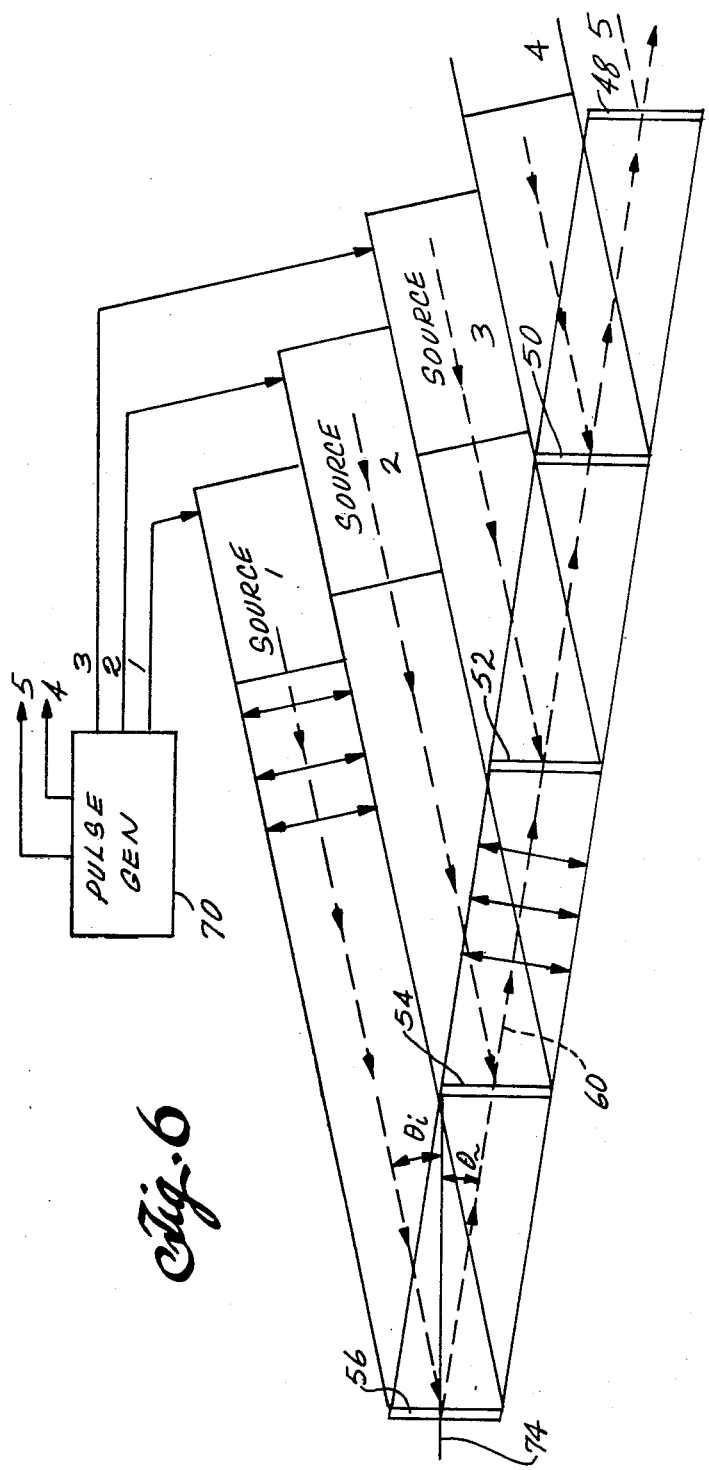

LASER BEAM POWER MULTIPLICATION

FIELD OF THE INVENTION

This invention relates to apparatus for combining laser beams from a plurality of sources, and more particularly, to a rotation mirror system for reflecting multiple beams along a common axis.

BACKGROUND OF THE INVENTION

Because there are practical limits to the pulse power from a single laser as well as limits to the pulse rates that can be achieved, it is desirable to combine beams from a plurality of separate laser sources into a single pulsed beam. Devices for combining beams from a number of sources or for splitting beams from a single source have generally employed beam splitters or semi-reflecting plates. In the case of beam combining systems, such a plate is used to reflect one beam along a path while allowing a beam from a second source to be transmitted through the plate along the same path. Such devices, however, are inefficient in that the beam splitter cannot reflect all the energy from the one source and transmit all the energy from the other source in combining the two beams.

SUMMARY OF THE INVENTION

The present invention is directed to an improved device using mirrors of high reflectivity to direct laser beams, for example, from a plurality of sources into a single beam along common axis. The beams from the several sources are pulsed in sequence. A rotating mirror assembly synchronized with the pulsing of the sources moves one mirror at a time into the path of each beam as it is pulsed, directing the beam along common axis. The rotary mirror assembly permits only one mirror in the path of the incident at the time a corresponding source is pulsed. The mirrors only move in the planes of their respective reflecting surfaces.

This is accomplished, in brief, by providing beam collecting and distributing apparatus comprising a rotor assembly which supports a plurality of mirrors positioned in a plurality of axially spaced planes that are transverse to the axis of rotation of the rotor assembly. The mirrors in each plane are angularly and radially offset from the mirrors in the other planes. A plurality of sources direct parallel beams at the same angle relative to the axis of rotation so that each beam is reflected by a mirror in a different one of said planes. The reflected beams from each plane are directed along a common axis. Because the mirrors in the respective planes are angularly offset, only one mirror is in position to reflect the associated beam at any one time. By synchronizing the rotation of the mirrors with the pulsing of the beams from the source, the mirrors in the respective planes are moved into position successively with the sequential pulsing of the beam sources.

BRIEF DESCRIPTION OF THE DRAWINGS

For a better understanding of the invention reference should be made to the accompanying drawings, wherein:

FIG. 1 is an end view of one embodiment of the present invention;

FIG. 2 is a sectional view taken substantially on the line 2—2 of FIG. 1;

FIG. 3 is a diagram showing the beam paths;

FIG. 4 is a timing diagram showing pulse timing of the multiple sources;

FIG. 5 is a diagrammatic showing of an alternative embodiment to the present invention; and FIG. 6 is a diagram showing the beam paths.

DETAILED DESCRIPTION

Referring to FIGS. 1 and 2 in detail, the optical system of the present invention includes a rotor assembly 10. The rotor assembly includes a mirror mounting hub 12 mounted on a shaft 14. The shaft 14 rotates in an air bearing assembly, indicated generally at 18. The air bearing assembly 18 is mounted on a support structure 20 having a suitable mounting flange 22. An electric motor 24 is coupled to the shaft 14 on the other side of the air bearing 18 by a suitable coupling such as a spline, indicated at 26. The air bearing 18 is of conventional design and allows rotation of the rotor assembly 10 at high speed with minimum vibration. Typical rotational speed of the rotor assembly is of the order of 15,000 rpm.

The outer surface of the rotor 12 is preferably formed with a series of cylindrical steps of increasing diameter, as indicated at 28, 30, 32, 34 and 36. Projecting from these cylindrical surfaces are a corresponding number of mirror flanges 38, 40, 42, 44 and 46. Each flange provides highly reflective mirror surfaces lying respectively in equally spaced parallel axially transverse planes, as indicated at 48, 50, 52, 54 and 56. The flanges are of increasing diameter so that the outer circumferences of the mirror surfaces lie in a single cone, as indicated by the dash line 58, whose axis of revolution 72 is the axis of rotation of the rotor assembly.

It will be seen from FIG. 3 that a light beam from source #1 having an angle of incidence $\theta_i$ on the mirror surface 56 is directed along an axis at an angle of reflection $\theta_r$ which intersects the axis of revolution at the same angle as the conical surface 58. The beam is reflected along a path parallel to the conical surface 58. Similarly, parallel beams from source #2–#5, incident respectively on the reflecting surfaces 54, 52, 50 and 48, are all reflected along the same common path parallel to the conical surface 58. The beam from the source #1 is directed at the mirror surface 56. Similarly, the beam from the source #2 is directed at the mirror surface 54, the beam from the source #3 is directed at the mirror surface 52, the beam from the source #4 is directed at the mirror surface 50, and from the source #5 at the mirror 48. Because the mirror surfaces are equally spaced in an axial direction and are at decreasing radial distances from the axis of revolution, the angle of incidence $\theta_i$ of the beams can be selected such that the beams are all reflected along a common axis 60.

In order that the reflected beams from the several sources may all be reflected along the common axis 60 without interference from the intermediate mirrors, the mirror flanges are notched and the beam sources are pulsed successively in synchronism with rotation of the rotor such that the notches in the intermediate mirror flanges are aligned at the time a beam is turned on. The notching arrangement is best shown in FIG. 1. Since no beam must pass through the mirror surface 56, the flange 46 is not notched. The next adjacent flange 44 is notched at equally spaced angular positions around the circumference, as indicated at 62. The angular width of the notches 62 in the flange 44 is approximately one-fifth the angular spacing between adjacent notches. Eight equally spaced notches are shown by way of example so the angular width of the notches 62 is approximately 9 degrees.

Similarly, flange 44 is notched, as indicated at 64, the width of the notch being twice that of the notch 62 or approximately 18 degrees. Flange 42 is notched, as indicated at 66, the width of the notch being approximately 27 degrees, and the flange 33 has a notch 66 which is four times the width of the notch 62 or 36 degrees.

The five light sources are pulsed in sequence by a pulse generator 70 having a timing pattern as shown in FIG. 4. It will be seen that the time between successive pulses corresponds to the time required for the rotor to be rotated 9 degrees (1/40 revolution). Thus the pulsed beam from source #1, after it is reflected off the mirror surface 56, passes through all four notches 62, 64, 66 and 68. When the #2 beam is pulsed, it is reflected off the mirror surface 54, which is now rotated into the plane of the beams, the reflected beam passing through notches 64, 66 and 68. As the rotor continues to rotate each reflecting surface in sequence rotates in position to reflect the corresponding pulsed beam through the notches in any flanges which are in front of the reflecting surface. As a result, a single beam is generated which is the composite of the five successively pulsed beams from the five sources. The pulse rate of the output beam is five times the pulse rate of any one of the input beams. Thus the optical system of the present invention allows a single beam to be generated from five laser sources, for example, which has five times the power and five times the pulse rate of a beam from a single laser source.

An alternative embodiment of the invention is shown in FIG. 5. In this arrangement, the mirrors are mounted in a conically shaped recess in the end of a cup-shaped rotor 80. The rotor is mounted on a shaft 82 which is journaled in a suitable bearing and motor drive assembly 84. Again, the mirror surfaces, five of which are indicated at 86, 88, 90, 92 and 94, are positioned in equally spaced parallel planes perpendicular to the axis of rotation of the rotor. The mirror surfaces are notched in the same manner as described in FIG. 1 so that light reflected from the surface 86, for example, from beam #1 passes through aligned notches in each of the other mirror surfaces. The arrangement of FIG. 5 otherwise operates in identical manner to that described in connection with the rotor assembly of FIGS. 1 and 2. The arrangement of FIG. 5 has the advantage that the rotor can be made more compact with smaller radial dimensions for a given amount of mirror surface, thus allowing higher rotational speeds to be employed. Also the arrangement of FIG. 5 lends itself to providing fluid passages for circulating coolant to prevent heat buildup from light energy absorbed at the reflecting surfaces. An inlet passage 86, for example, connects through internal passages to coolant cavities such as indicated at 88 extending behind each of the mirror surfaces. Return flow is through outlet passages 90 in the shaft 82.

From the above description it will be seen that an optical system is provided which can be used to combine beams from a plurality of sources into a single beam. However, because of the reciprocal characteristics of the device, it can be also used as a beam distributor in which a single pulse beam directed along a common axis is chopped and distributed into a plurality of output beams. If a continuous input beam is provided, the output beams are pulsed at a pulse duration and repetition rate determined by the rotational velocity of the rotor and the number of axially spaced reflecting surfaces. A pair of units could be used, for example, for both coding and decoding a light beam by pulse code modulation.

It will be further appreciated that while a single group of sources lying in a common plane with the axis of rotation has been described, additional groups of sources can be located at different angular positions corresponding to the number of notches around the circumference of the rotor. Thus in the example shown in FIGS. 1 and 2, a total of eight groups of five sources could be employed, each group generating a separate output beam. The multiple groups of sources, if added to the arrangement of FIGS. 1 and 2, produce multiple output beams that converge on a common point along the axis of rotation.

Other advantages of the rotating optical system are that a single common central axis of rotation is provided for all the mirror elements, making for simplified mechanical construction. Since the angle of incidence and reflection remain constant as the mirrors rotate, the beam is not distorted by pulse timing, and the wave front is not distorted between the source and the target. This advantage may be seen by referring to FIG. 6. The angle $\theta_i$ of the incident beam from source normal axis 74 of mirror surface 56 is equal to the angle $\theta_r$ of the reflected beam to the normal axis 74. This equality of $\theta_i$ and $\theta_r$ is true for all sources 1-5 and mirror surfaces 56, 54, 52, 50, and 48, respectively. All normal axis-to-mirror surfaces 56, 54, 52, 50, and 48 are parallel to the axis of revolution 72.

It is to be understood that what has been described is merely illustrative of the principles of the invention and that numerous arrangements in accordance with this invention may be devised by one skilled in the art without departing from the spirit and scope thereof.

What is claimed is:

1. Light beam collecting and distributing apparatus comprising:
a rotor, means for rotating the rotor at a predetermined angular velocity, a plurality of mirrors, and means mounting the mirrors on the rotor with the mirrors positioned with the reflecting surfaces lying in a plurality of parallel planes perpendicular to the axis of rotation of the rotor, there being at least one mirror surface in each of said planes, the mirrors in successive planes being positioned at radially greater distances from the axis of the rotor.

2. Apparatus of claim 1 wherein the mirrors have parallel planar reflecting surfaces.

3. Apparatus of claim 1 wherein the centers of the mirrors in each plane terminate in radial edges that are angularly offset from the mirrors in the other planes.

4. Apparatus of claim 3 further including means directing a plurality of parallel beams of light, the axes of said respective parallel beams intersecting the mirrors in different planes, the beams being reflected by the mirrors in the respective planes along a common axis.

5. Apparatus of claim 4 wherein the rotor supporting the mirrors is positioned radially outside said mirrors.

6. Apparatus of claim 4 wherein the rotor supporting the mirrors is positioned radially inside said mirrors.

7. Apparatus for combining beams from a plurality of light sources into a common beam, comprising:
a rotor assembly, means supporting the rotor for rotation about an axis, and means driving the rotor at a constant angular velocity, the rotor assembly including a plurality of individual reflecting surfaces lying in parallel planes spaced apart axially of the rotor, the reflecting surfaces at successive axial positions being spaced at successively greater radial distances from the rotational axis of the rotor.

8. Apparatus of claim 7 wherein the reflecting surfaces in each reflecting plane have gaps therein, the gaps in the several planes overlapping such that incident light reflected from any of said reflecting surfaces along a common axis in a plane containing the axis of rotation passes through said gaps in the intervening planes.

* * * * *